(12) United States Patent
Albrecht

(10) Patent No.: US 7,738,467 B2
(45) Date of Patent: Jun. 15, 2010

(54) OUTPUT PORT BASED DOUBLE Q TAGGING

(75) Inventor: Alan Ray Albrecht, Granite Way, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1112 days.

(21) Appl. No.: 10/620,109

(22) Filed: Jul. 15, 2003

(65) Prior Publication Data
US 2005/0013306 A1  Jan. 20, 2005

(51) Int. Cl.
H04L 12/56 (2006.01)
(52) U.S. Cl. .................. 370/395.53; 370/401; 370/409
(58) Field of Classification Search .................. 370/229, 370/230, 231, 395.2, 395.21, 395.3, 389, 370/392, 474, 475, 36, 397, 395.53, 400–401, 370/409; 709/238, 239, 240
See application file for complete search history.

(56) References Cited

U.S. PATENT DOCUMENTS

| | | | |
|---|---|---|---|
| 5,825,772 A * | 10/1998 | Dobbins et al. ............. 370/396 |
| 6,035,405 A | 3/2000 | Gage et al. ..................... 726/15 |
| 6,181,699 B1 * | 1/2001 | Crinion et al. ............. 370/392 |
| 6,414,958 B1 | 7/2002 | Specht .................. 370/395.53 |
| 6,430,621 B1 * | 8/2002 | Srikanth et al. ............. 709/238 |
| 6,515,993 B1 | 2/2003 | Williams et al. ........ 370/395.53 |
| 6,526,052 B1 | 2/2003 | Rijhsinghani et al. ....... 370/389 |
| 6,707,818 B1 * | 3/2004 | Kadambi et al. ............. 370/391 |
| 6,788,681 B1 * | 9/2004 | Hurren et al. ................ 370/392 |
| 7,088,714 B2 * | 8/2006 | Athreya et al. .............. 370/389 |
| 2004/0066781 A1 * | 4/2004 | Shankar et al. ............. 370/389 |
| 2007/0110078 A1 * | 5/2007 | De Silva et al. ........ 370/395.53 |

* cited by examiner

*Primary Examiner*—Ricky Ngo
*Assistant Examiner*—Pao Sinkantarakorn

(57) ABSTRACT

One embodiment disclosed relates to a method of processing a packet sent to a provider network. The packet is received via a user port of an edge switch of the network. Forwarding and routing by the edge switch is determined based on a user VID. A provider VLAN tag, including a provider VID, is inserted into the packet prior to transmission of the packet via a provider port of the edge switch.

13 Claims, 4 Drawing Sheets

| MAC DA 202 | MAC SA 204 | User Etype 206 | User VID/COS 208 | L2 Etype/Encap 210 | ... |

| MAC DA 202 | MAC SA 204 | Provider Etype 222 | Provider VID/COS 224 | User Tag Etype 206 | User VID/COS 208 | L2 Etype/Encap 210 | ... |

OUTPUT PORT BASED DOUBLE Q TAGGING

BACKGROUND OF THE INVENTION

1. Field of the Invention

The present invention relates generally to networking and communications technology.

2. Description of the Background Art

Local area networks (LANs) that are IEEE 802 compliant may be connected together with media access control (MAC) bridges. The IEEE 802.1Q standard defines the operation of virtual LAN (VLAN) bridges that permit the operation of VLANs within a bridged LAN infrastructure. In accordance with IEEE 802.1Q, data frames may be routed between ports of the VLAN according to VLAN tags. Double Q tagging is an enhancement to IEEE 802.1Q. One technique for implementing double Q tagging has disadvantages that are discussed below.

SUMMARY

One embodiment of the invention pertains to a method of processing a packet sent to a provider network. The packet is received via a user port of an edge switch of the network. Forwarding and routing by the edge switch is determined based on a user VLAN identifier (VID). A provider VLAN tag, including a provider VID, is inserted into the packet prior to transmission of the packet via a provider port of the edge switch.

Another embodiment of the invention pertains to a switch apparatus for processing a packet sent to a provider network. The apparatus includes a user port, forwarding logic, and a provider port. The user port receives the packet. Forwarding and routing for the packet is determined by the forwarding logic based on a user VID. A provider VLAN tag, including a provider VID, is inserted into the packet prior to transmission of the packet via the provider port.

Another embodiment of the invention pertains to a system for processing packets sent to a provider network. The system includes at least a first switch and a second switch. The first switch is configured to receive a packet via a user port, to determine routing and forwarding for the packet based on a user VID, and to insert a provider VLAN tag into the packet at a provider port prior to transmission of the packet. The second switch is configured to receive the packet via a provider port, to strip the provider VLAN tag from the packet at the provider port, and to determine routing and forwarding for the packet based on the user VID.

Another embodiment of the invention pertains to a method of routing and forwarding a packet using double Q tagging. The double Q tagging is utilized to create a tunnel between a user port of a first switch and a user port of a second switch. In accordance with the embodiment, a user-expected service level is provided in relation to traffic flowing through the tunnel.

BRIEF DESCRIPTION OF THE DRAWINGS

FIG. 2A shows a packet format including a user VLAN tag.

FIG. 2B shows a packet format including both a user VLAN tag and a provider VLAN tag.

DETAILED DESCRIPTION

Double Q tagging (double VLAN tagging) is an enhancement to the IEEE 802.1Q VLAN tagging standard. A user packet may be received with a first VLAN tag, typically a user tag. Double Q tagging adds a second VLAN tag, typically a provider tag, to the packet for the purpose of forwarding the packet across an extended network, such as a provider's metropolitan area network. The second tag is stripped before transmission back to the user network. In effect, the second tag is used to create a "tunnel" across the provider network.

Double Q tagging may be applied to extend a layer 2 VLAN domain over an extended network. For example, a sales office and a central office could be on the same subnet by having a metro area service provider use double Q tagging to tunnel the layer 2 traffic between the sites.

One technique to implement double Q tagging involves inserting the provider tag upon reception of the user packet at a source user port of a first switch. The first switch may then forward and act on the provider tag information and ignore the information in the buried user tag. On exit to a user port of another switch at the end of the tunnel, the provider tag is removed. The destination user port then receives a packet that is the same as originally entered the tunnel. However, there are some disadvantages of this technique.

First, the first switch bases decisions on the inserted provider tag and ignores the buried user tag. Hence security, quality of service, and management features that are normally based on the user tag are not available or supported.

Second, it may be desirable for the switch to route a packet from one user port of the first switch to another user port on the same switch. This is especially true in configurations where the switch has primarily user ports and has few provider ports. The above technique does not support such routing of the packet between two user ports of the same switch. This is because the switch adds the provider tag at the source user port and ignores the user tag in making routing decisions.

Third, the packet exits out of the destination user port in the same form as it arrived at the source user port. If the packet arrives untagged, then it exits untagged. If the packet arrives tagged, then it exits tagged. This is disadvantageous in that the tagging or untagging of the packet is independent of the needs of the destination port.

Fourth, Internet Protocol (IP) multicast replication requires modifying the user VLAN. The inability to modify the user tag hence prevents support of IP multicasting.

Figure 1:
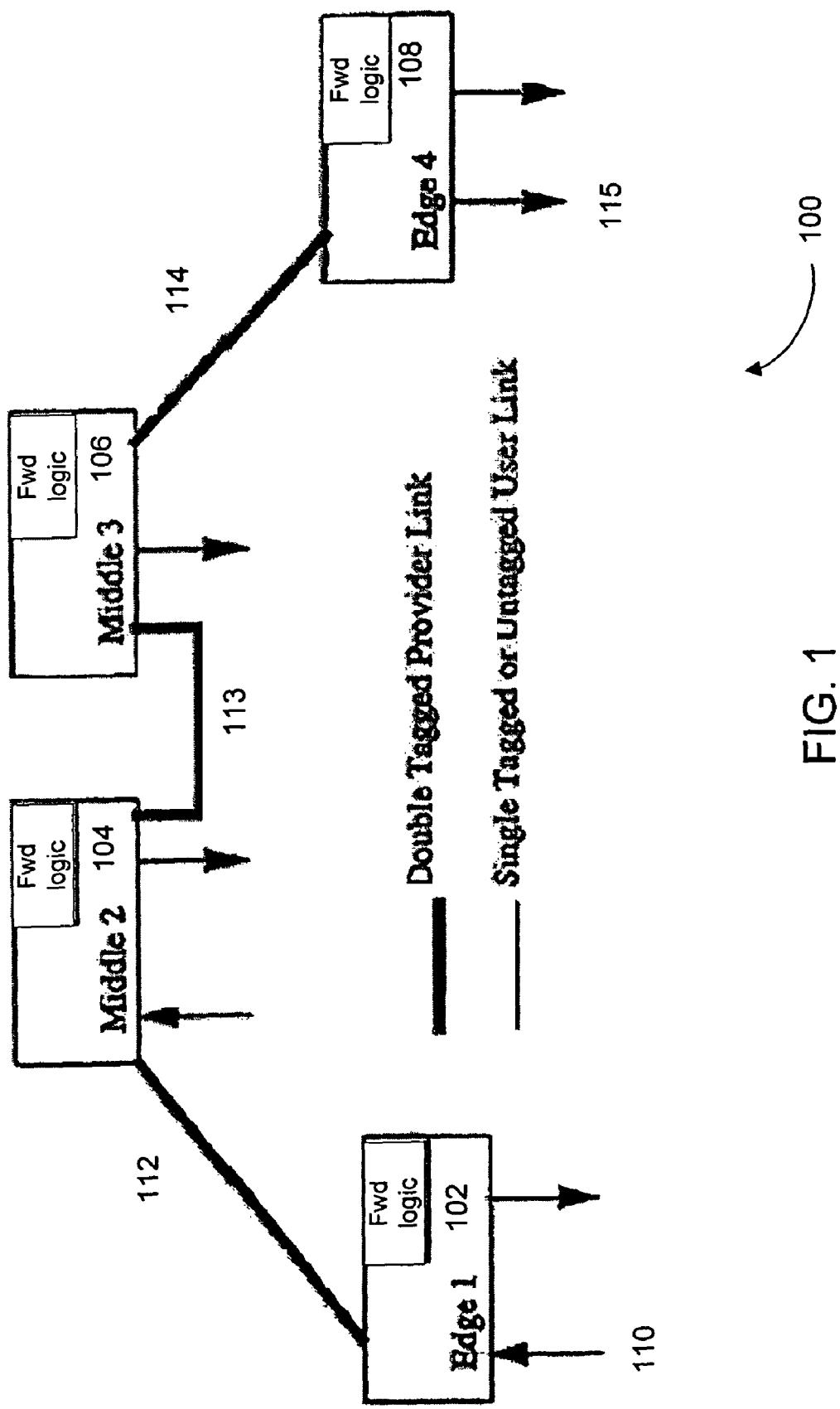
FIG. 1 is a schematic diagram depicting a network topology for double VLAN (Q) tagging in accordance with an embodiment of the invention.

FIG. 1 is a schematic diagram depicting a network topology 100 for double VLAN (Q) tagging in accordance with an embodiment of the invention. The example network 100 includes four switches, each of which includes forwarding logic, memory, and various other components. Of course, the present invention should not be restricted to a particular number of switches. In accordance with one embodiment, a switch may operate in either an edge mode or a middle mode, and individual ports on these switches may be configured as either user ports or provider ports.

A first switch (Edge 1) 102 operates in an edge mode and receives a user packet from one of its user links 110. The user link 110 may be single (user) tagged or untagged. The user link 110 connects to the switch 102 by way of a source user port. A second switch (Middle 2) 104 operates in a middle mode and is communicatively coupled to the first switch 102 via a provider link 112. The provider link 112 is double tagged in that packets transmitted thereon may include both a provider tag and a user tag (or just a provider tag if the user packet was untagged). A third switch (Middle 3) 106 also operates in a middle mode and is communicatively coupled to the second switch 104 via a second provider link 113. The second provider link 113 connects to the switches 104 and 106 by way of provider ports. A fourth switch (Edge 4) 108 is communicatively coupled to the third switch 106 via a third provider link 114. Like the first switch 102, the fourth switch 108 operates in an edge mode. The user packet exits the fourth switch 108 at a destination user port to a user link 115 connected thereto.

FIG. 2A shows a packet format 200 including a user VLAN tag. A user packet may have such a format, if tagged. The depicted packet 200 includes the following fields: a media access control (MAC) destination address (DA) 202; a MAC source address (SA) 204; a user ether type (etype) 206; a user VLAN identifier (VID)/class of service (COS) 208; a layer two (L2) etype/encapsulation 210; and other fields (including the packet payload). A user VLAN tag comprises the user etype 206 and user VID/COS 208. If the user packet is untagged, then the packet 200 would not have the user tag etype 206 or VID/COS 208 fields.

FIG. 2B shows a packet format 220 including both a user VLAN tag and a provider VLAN tag. A provider packet may have such a format, if the user packet is tagged. The packet format 220 shown in FIG. 2B is similar to the packet format 200 shown in FIG. 2A. However, the packet format 220 shown in FIG. 2B includes a provider tag inserted therein. The provider tag may comprise a provider tag etype 222 and a provider VID/COS 224. If the user packet is untagged, then the packet 220 would not have the user tag etype 206 or VID/COS 208 fields.

Figure 3:
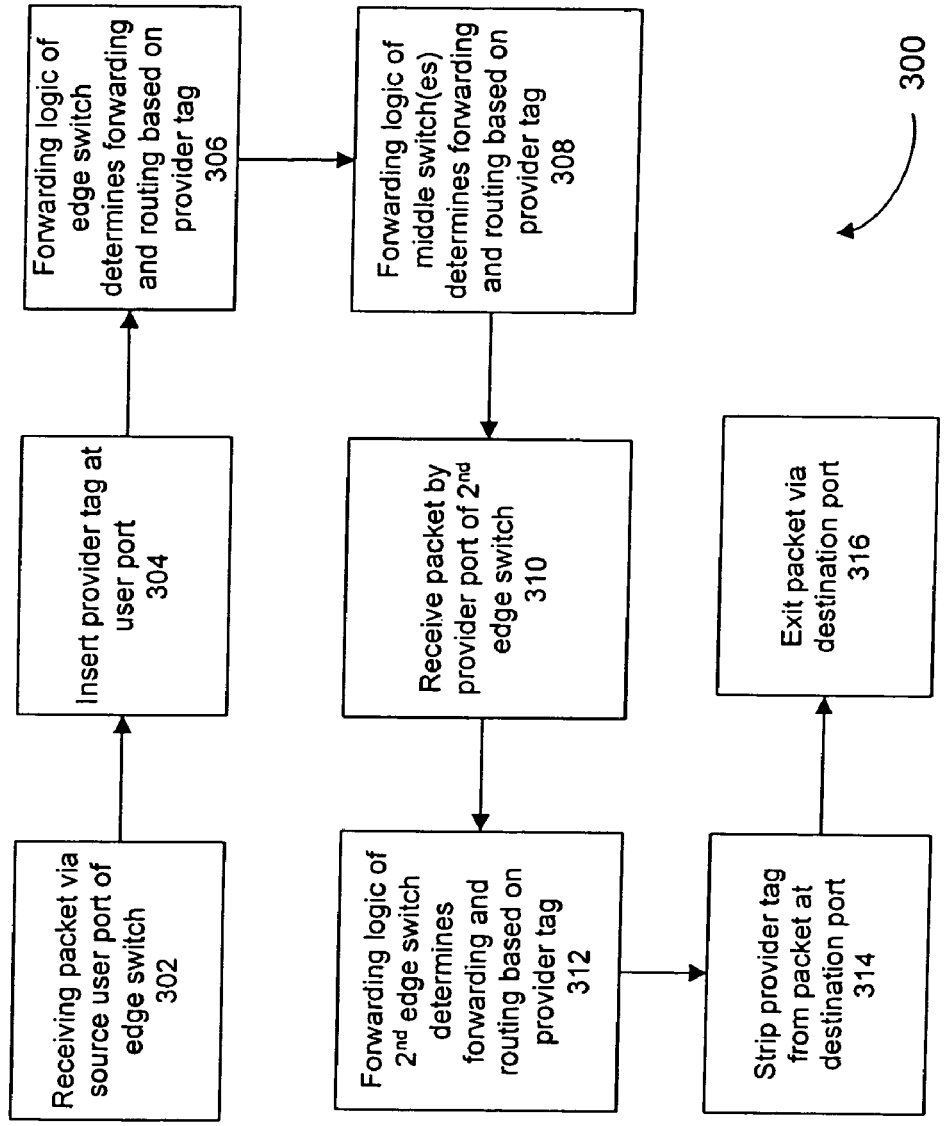
FIG. 3 is a flow chart depicting a disadvantageous method of double tagging to forward a packet across a service provider network.

FIG. 3 is a flow chart depicting a disadvantageous method 300 of double tagging to forward a packet across a service provider network. This method 300 relates to the disadvantageous technique discussed previously.

A packet is received 302 via a source user port of an edge switch. The packet may arrive tagged with a user VLAN tag. The packet may arrive with a format like that depicted in FIG. 2A.

Upon receipt of the packet, a provider VLAN tag is inserted 304 into the packet at the user port. The provider tag may be inserted after the MAC addresses and before the user tag. A packet with both provider tag and user tag may be called double Q tagged or double tagged.

The forwarding logic of the edge switch then determines 306 forwarding and routing for the packet based on the provider tag. Subsequently, the forwarding logic of a middle switch also determines 308 forwarding and routing for the packet based on the provider tag, while ignoring the buried user tag. Such a determination 308 may also be performed by the forwarding logic of additional middle switches along the routing path.

Eventually, the packet is transmitted from the last middle switch to a second edge switch. The packet is received 310 via a provider port of the second edge switch. Similar to step 306, the forwarding logic of the second edge switch then determines 312 the forwarding and routing for the packet based on the provider tag. Finally, a destination (user) port of the second edge strip strips 314 the provider tag from the packet, and the packet exits 316 via the destination port.

The above method 300 of double Q tagging has the various disadvantages discussed above. For example, security, quality of service, and management features that are normally based on the user tag are not available or supported.

Figure 4:
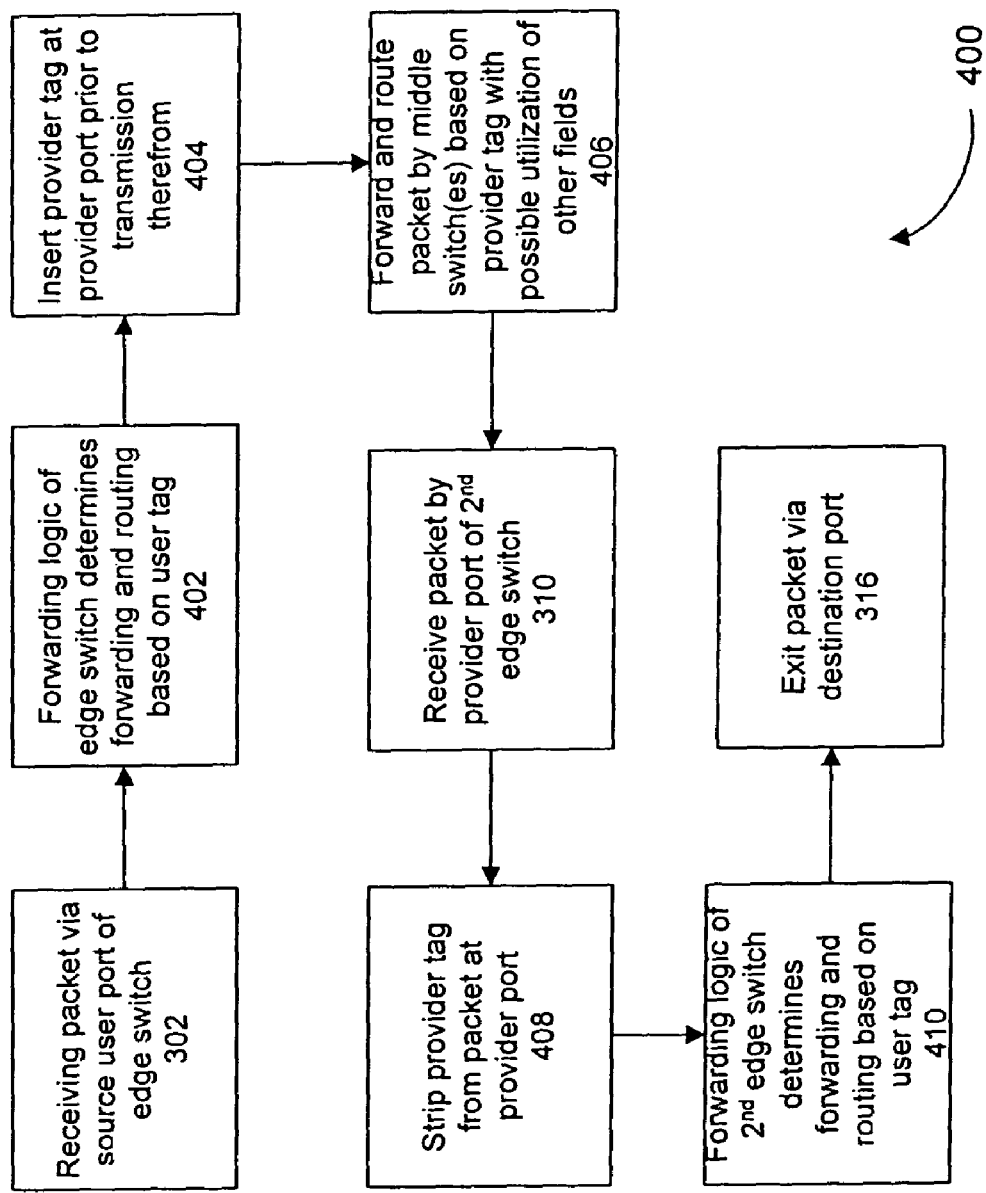
FIG. 4 is a flow chart depicting an advantageous method of double tagging to forward a packet across a service provider network in accordance with an embodiment of the invention.

FIG. 4 is a flow chart depicting an advantageous method 400 of double tagging to forward a packet across a service provider network in accordance with an embodiment of the invention.

Like in FIG. 3, a packet is received 302 via a source user port of an edge switch. The packet may arrive tagged with a user VLAN tag and have a format like that depicted in FIG. 2A. Alternatively, the packet may arrive untagged. If the packet arrives untagged, then, in some embodiments, a user tag based on the port VLAN identifier (PVID) of the user port may be inserted into the packet after the MAC addresses.

Unlike in FIG. 3, the next step does not involve insertion of the provider VLAN tag at the user port. Instead, the forwarding logic of the edge switch determines 402 forwarding and routing for the packet based on the user tag and other contents of the packet. This can be done prior to insertion of the provider tag.

The provider tag is inserted 404 at the provider port prior to transmission of the packet from the provider port. The provider tag includes a provider VID. The provider VID may be selected based on a destination VLAN. Alternately, the provider VID may comprise a port VID associated with the input port.

Insertion 404 of the provider tag at the provider port, instead of at the user port, has advantageous consequences. For example, it enables the routing of the packet between two user ports on the same switch.

After being transmitted from the provider port, the packet is forwarded and routed 406 by one or more middle switches. The forwarding and routing 406 by the middle switch(es) may be based on the provider tag. In addition, the middle switch(es) may look at and utilize the user tag (for example, for COS determination or other uses) or other packet fields (for example, layer 3 or layer 4 fields or other fields).

Eventually, the packet is transmitted from the last middle switch to a second edge switch. The packet is received 310 via a provider port of the second edge switch.

The provider port of the second edge switch strips 408 the provider tag from the packet. In contrast, the stripping 314 of the provider tag in FIG. 3 occurs later at the destination port. Next, forwarding logic of the second edge switch determines 410 forwarding and routing based on the user tag. This contrasts with the analogous determination 312 in FIG. 3 which occurs based on the provider tag. Finally, the packet exits 316 via a destination user port of the second edge switch.

As discussed above, an embodiment of the invention provides a method of routing and forwarding packets using double Q tagging. The second (provider) tag is inserted upon exit at a provider port, instead of upon receipt at a user port. The double Q tagging is utilized to create a tunnel between a user port of a first switch and a user port of a second switch. A user-expected service level may be provided in relation to traffic flowing through the tunnel. The user-expected service level may involve a quality of service (QOS) level, such as a COS level, for the packets. The user-expected service level may also involve a security action for the packets. The security action may comprise, for example, dropping the packet, or forwarding the packet to management software for further analysis.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of processing a packet sent to a provider network, the method comprising:
    receiving the packet via a first user port at a first edge switch of the network, wherein the first user port is an input port of the first edge switch;
    determining forwarding and routing by the first edge switch based on a user VLAN identifier (VID) of a user VLAN tag for the packet;
    creating a tunnel from the first user port at the first edge switch to a second user port at a second edge switch using double VLAN tagging by inserting a provider VLAN tag, including a provider VID, into the packet at a first provider port at the first edge switch prior to transmission of the packet via the first provider port and stripping the provider VLAN tag from the packet after the packet is received by a second provider port at the second edge switch, wherein the first provider port is an output port of the first edge switch, wherein the second provider port is an input port of the second edge switch, and wherein the second user port is an output port of the second edge switch; and
    utilizing the user VLAN tag by a middle switch to determine a class of service for the packet so as to provide a user-expected service level in relation to traffic flowing through said tunnel.

2. The method of claim 1, further comprising:
    forwarding and routing the packet by a middle switch based on the provider VLAN tag.

3. The method of claim 1, wherein the packet received includes the user VLAN tag, and wherein the user VID is derived from the user VLAN tag.

4. The method of claim 1, wherein the packet received does not include a user VLAN tag, and wherein the user VID is assigned to be a port VID associated with the user port.

5. The method of claim 1, wherein the provider VID comprises a VID of a destination VLAN.

6. The method of claim 1, wherein the provider VID comprises a port VID associated with the input port.

7. The method of claim 1, wherein the first edge switch also determines the class of service for the packet based on the user VLAN tag.

8. The method of claim 1, wherein the first edge switch determines the security action for the packet based on the user VLAN tag.

9. The method of claim 1, wherein the packet is routed to more than one middle switch before arriving at the second edge switch.

10. A switch apparatus for processing a packet sent to a provider network, the apparatus comprising:
    a user port for receiving the packet, the user port being an input port of the switch apparatus;
    forwarding logic for determining forwarding and routing based on a user VLAN identifier (VID) of a user VLAN tag for the packet, including determination of a class of service based on the user VLAN tag; and
    a provider port that inserts a provider VLAN tag, including a provider VID, into the packet prior to transmission of the packet such that the transmitted packet has at least two VLAN tags, the provider port being an output port of the switch apparatus, such that a tunnel is created from the user port of the switch apparatus to another user port of a different switch apparatus, wherein a user-expected service level is provided in relation to traffic flowing through said tunnel.

11. A system for processing packets sent to a provider network, the system comprising:
    a first switch configured to receive a packet via a user port, to determine routing and forwarding for the packet based on a user VID of a user VLAN tag, and to insert a provider VLAN tag into the packet at a provider port prior to transmission of the packet such that the transmitted packet has at least two VLAN tags therein;
    a second switch configured to receive the packet having at least two VLAN tags via a provider port, to strip the provider VLAN tag from the packet at the provider port, and to determine routing and forwarding for the packet based on the user VID for the user VLAN tag; and
    a middle switch communicatively coupled between the first and second switches,
    wherein a tunnel is created between the user port of the first switch and a user port of the second switch, and
    wherein a service level is provided in relation to traffic flowing through said tunnel which provides a security action of dropping the packet or forwarding the packet to management software,
    wherein the security action is determined based on the user VLAN tag.

12. The system of claim 11, further comprising utilization of a class of service (COS) for routing and forwarding of the packet that is based on the user VID.

13. An apparatus for processing a packet sent to a provider network, the apparatus comprising:
    means for receiving the packet via a user port of an edge switch of the network, the user port being an ingress port for the edge switch;
    means for determining forwarding and routing by the edge switch based on a user VLAN identifier (VID) of a user VLAN tag for the packet and for determining a class of service based on the user VLAN tag; and
    means for inserting a provider VLAN tag, including a provider VID, into the packet at a provider port of the edge switch prior to transmission of the packet via the provider port, the provider port being an egress port of the edge switch, such that a tunnel is created between the user port of the edge switch and a user port of a different edge switch, wherein a service level is provided in relation to traffic flowing through said tunnel.

* * * * *